(12) United States Patent
Buchholz et al.

(10) Patent No.: US 6,415,621 B2
(45) Date of Patent: Jul. 9, 2002

(54) AIRCRAFT AIR CONDITIONING SYSTEM PROVIDING AUXILIARY VENTILATION

(75) Inventors: Uwe Buchholz, Bliedersdorf; Juergen Kelnhofer, Jork; Thomas Scherer, Hamburg, all of (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/795,230

(22) Filed: Feb. 27, 2001

(30) Foreign Application Priority Data

Feb. 29, 2000 (DE) .......................... 100 09 373

(51) Int. Cl.[7] .............................. F25D 9/00; F25B 29/00
(52) U.S. Cl. ................................ 62/402; 62/87; 62/173
(58) Field of Search ............................ 62/87, 402, 172

(56) References Cited

U.S. PATENT DOCUMENTS

| | | | | |
|---|---|---|---|---|
| 2,772,621 A | * | 12/1956 | Arnoldi | 62/172 |
| 3,543,534 A | * | 12/1970 | Pacault et al. | 62/402 |
| 5,704,218 A | * | 1/1998 | Christians et al. | 62/172 |
| 5,860,283 A | * | 1/1999 | Coleman | 62/87 |
| 6,161,392 A | * | 12/2000 | Jirnov et al. | 62/87 |

* cited by examiner

Primary Examiner—William C. Doerrler
(74) Attorney, Agent, or Firm—W. F. Fasse; W. G. Fasse

(57) ABSTRACT

An air conditioning system for an aircraft includes a first rotatable shaft with a first compressor, a first turbine, a cooling air fan, and an auxiliary compressor connected for rotation therewith, and preferably further includes a second rotatable shaft with a second compressor and a second turbine connected for rotation therewith. A compression, cooling, and expansion cycle driven by at least the first compressor and the first turbine provides a principle flow of air conditioning air. The auxiliary compressor draws in outside air and provides a redundant auxiliary ventilation air flow, which is supplied into the installation space in which the air conditioning unit is installed, or another space in the aircraft that requires a reliable constant ventilation and cooling whenever the air conditioning unit is operational. The auxiliary ventilation air may be connected to a common air distribution network with other air conditioning units.

18 Claims, 3 Drawing Sheets

PRIOR AIR

AIRCRAFT AIR CONDITIONING SYSTEM PROVIDING AUXILIARY VENTILATION

This application is based on and claims the priority under 35 U.S.C. §119 of German Patent Application 100 09 373.6, filed on Feb. 29, 2000, the entire disclosure of which is incorporated herein by reference.

FIELD OF THE INVENTION

The invention relates to an air conditioning system especially for a passenger aircraft that includes at least one rotational shaft with a rotary compressor and a rotary turbine mounted thereon, to provide at least one compression stage and at least one expansion stage of an air cycle cooling process. The air conditioning system especially provides a redundant or auxiliary ventilation.

BACKGROUND INFORMATION

In all known aircraft having an integrated air conditioning system, the required cooling energy is recovered from highly compressed engine bleed air, through an air cycle including a thermodynamic air compression and expansion process with an intermediate cooling of the compressed air. Various condensation processes are provided in the circuit for drying, i.e. removing moisture from, the air. Other cooling processes are also known, in which the compression and expansion processes are at least partially replaced by hybrid cooling processes, for example in order to compensate for insufficient pressure energy from the engine bleed air. These compression and expansion processes can be circuit-connected in various manners, whereby these processes are typically carried out by turbo-machines including compressors and turbines mounted on rotating shafts.

In this context, the number of rotating shafts and the number of turbo-machines can be varied, which leads to different characteristic properties or behaviors of the overall respective system. In any event, it is of course physically required to achieve an energy balance, i.e. a balanced energy equation, for all of the energetically relevant devices (turbo-machines, compressors, turbines, blowers, etc.) mounted on each respective shaft. In other words, for each rotating shaft, the energy input necessarily equals the energy output. This must be taken into account when arranging different rotary devices on a respective shaft.

Moreover, air cycle cooling processes are known that operate with one stage compression and one stage expansion, one stage compression and two stage expansion, as well as two stage compression and two stage expansion. Examples of such cooling processes and arrangements are disclosed in U.S. Pat. Nos. 5,086,622 and 5,887,445. These known processes and apparatus respectively work with different combinations and arrangements of compressors and turbines mounted on various shafts, whereby the compressors and turbines are incorporated into the main air cycle.

In any event, an energy balance must always be maintained per each shaft, whereby the energy output of the total system is achieved by the respective particular circuit connection of the shafts and the turbo-machines, and in view of the energy input of the hot compressed engine bleed air. In this context, furthermore, the air conveying and throttling apparatuses, the intercooling unit, and the condenser group that are allocated to and connected to the turbo-machines must be tuned or adapted with regard to their size and efficiency, to properly match the total energy to be output from the system.

The energy that is transferred and transformed through such a cooling unit or air conditioning pack is unavoidably associated with power losses, which are given off as thermal heat energy and/or particularly thermal radiation, into the installation environment immediately surrounding the cooling unit. As a result, if such a cooling unit is integrated into an enclosed space in an aircraft, then this power dissipation in the form of heat will be given off into the surrounding space, which will directly increase the temperature of the air in this space as well as the surrounding aircraft structure.

The above mentioned heating of the installation space in which a cooling unit is installed in an aircraft is undesirable, because the installation space may overheat and require the cooling unit to be shut down, unless the heat can be removed from the installation space. Therefore, the excessive heating of the installation space has been counteracted in some aircraft by installing a forced ventilation system driven by an external energy source to achieve a positive ventilation of the installation space. This forced positive ventilation system is operated so as to achieve a comfortable or acceptable temperature range of the pertinent space. A separate turbo-compressor machine may be used as the external energy source for providing the positive ventilation air flow. Namely, a turbine connected to a rotatable shaft is driven by energy-rich engine bleed air so as to drive the shaft with a shaft power that is provided for driving the compressor mounted on this shaft. The compressor in turn takes in a quantity of external air, compresses it to the required pressure level and provides the resulting compressed air through a connected air distribution network to the surrounding installation spaces in which the air conditioning units are installed, so as to achieve a positive forced ventilation of these spaces. This achieves a suitable cooling of these installation spaces, as long as the separate turbo-compressor continues operating properly. However, if this separate turbo-compressor fails for any reason, then the positive forced ventilation and cooling of the installation spaces of the air conditioning units will not be provided, whereupon these spaces and the associated air conditioning units will overheat and must necessarily be shut down.

SUMMARY OF THE INVENTION

In view of the above, it is an object of the invention to provide an air conditioning system especially for a commercial passenger transport aircraft, which reliably provides a redundant supply of ventilation air through an air distribution network to all areas or spaces within the aircraft that are connected to this air distribution network. It is a further object of the invention to provide a reliable positive forced ventilation and cooling of the installation space in which an air conditioning unit is installed, whereby this ventilation is necessarily reliably maintained whenever the air conditioning unit is operating.

The above objects have been achieved according to the invention in an air conditioning system for an aircraft, including a first rotatable shaft with a first compressor and a first turbine connected thereto so as to rotate together with the shaft. Further according to the invention, an additional auxiliary compressor is connected to the first shaft, and a ventilation or auxiliary air line is connected to an outlet of the auxiliary compressor, such that compressed air provided by the auxiliary compressor is transported through the ventilation air line. An air inlet of the auxiliary compressor is connected to the outside environment surrounding the aircraft, or to the internal environment within the aircraft surrounding the auxiliary compressor, or even to some other source of air.

Throughout this specification, an air "line" generally refers to any duct, hose, pipe, channel or the like, through which air can be conveyed and directed. The auxiliary air line will also be referred to as a ventilation air duct, for example, in the following embodiments. The general term "air-moving device" refers to a compressor, a turbine, a blower, a fan, an air pump or the like, which moves or is moved by a flow of air and which converts mechanical rotation power to air-flow power or vice versa. Any compressor referred to herein, including the auxiliary compressor, can be embodied as a radial flow compressor, an axial flow compressor, or a diagonal flow compressor. A compressor, a turbine, or a fan is considered "connected" to a rotatable shaft if it is directly fixedly mounted thereon, formed integrally therewith, or connected by any form of gearing or transmission that will transmit rotational power between the shaft and the compressor, turbine or fan. Thus, the rotation speed of the shaft may be different from the rotation speed of the device connected thereto.

The ventilation air duct (or auxiliary air line) connected to the auxiliary compressor can be connected to and direct the auxiliary ventilation air to an installation environment or installation space in which a respective air conditioning unit is installed, or to another compartment or space within the aircraft that requires positive forced ventilation at all times in a redundant and reliable manner. With this arrangement, the invention assures that whenever the first shaft of the air conditioning system is rotating, i.e. whenever this air conditioning unit is operating, the auxiliary compressor is also operating and providing cooling air to the installation space of the air conditioning unit, and/or to other spaces in the aircraft that require a constant ensured positive ventilation. Thus, whenever the respective air conditioning unit is operable, it can be ensured that its respective installation space is also properly ventilated and cooled, to avoid an overheating of the installation space and thereby avoid the necessity of shutting down an air conditioning unit (even though the air conditioning unit would otherwise be operational) merely because its installation space is becoming overheated.

It is further provided by detailed features of the invention, that the air conditioning system may include a second rotatable shaft with a second compressor and a second turbine connected thereto for rotation with this second shaft. The first compressor, second compressor, first turbine and second turbine may be connected in air flow series circuit to provide a two stage compression and expansion process with intercooling provided by one or more heat exchangers.

Also, the inventive air conditioning system may include a plurality of such air conditioning units that each includes a respective first shaft with a first compressor, a first turbine, and an auxiliary compressor mounted thereon. The ventilation air duct connected to the respective auxiliary compressor of each one of these air conditioning units can be connected in common to a ventilation air distribution duct, to ensure that the ventilation air can be provided redundantly to the various spaces that require constant positive ventilation, even in the event of the failure or malfunctioning of one of the several air conditioning units. The redundant or auxiliary air can alternatively or additionally be provided to one or more of the other air conditioning units to supplement or replace the compressed air needs of the air conditioning units in the event of the partial or total failure of one of the compressors thereof.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
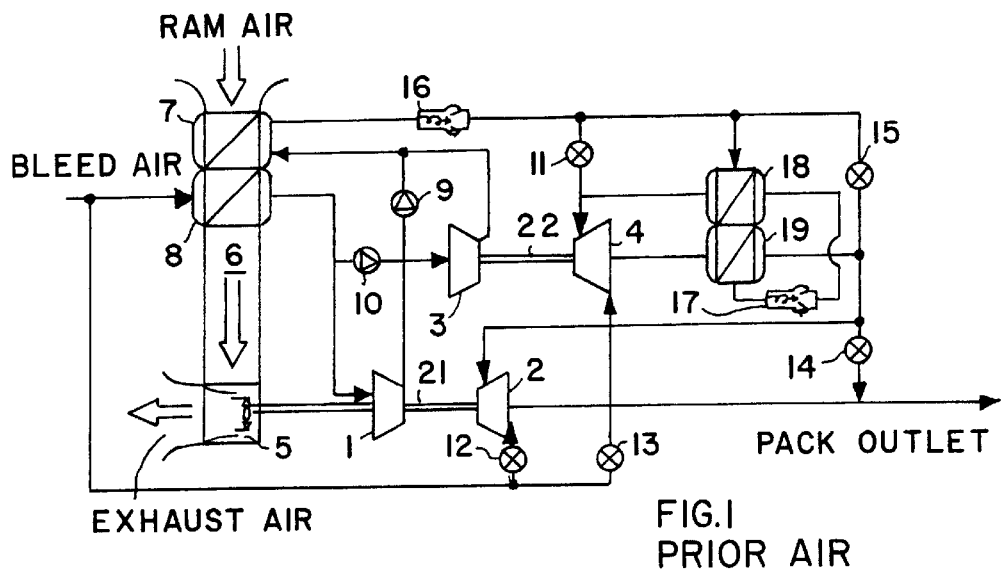
FIG. 1 is a general schematic block circuit diagram of a two stage air conditioning system for an aircraft, without the special auxiliary compressor according to the invention.

FIG. 1 shows a general simplified air conditioning system with a two stage compression and expansion in the air cycle cooling process according to the prior art. Namely, this aircraft air conditioning system includes two air cycle machines, whereby a first air cycle machine includes a first compressor 1 and a first turbine 2 fixed to or connected to a first rotatable shaft 21 for rotation with this shaft 21, and a second air cycle machine includes a second compressor 3 and a second turbine 4 fixed to or connected to a second rotatable shaft 22 for rotation with this shaft 22. The first air cycle machine further includes a blower or fan 5 mounted on an end of the first rotatable shaft 21, on a side of the first compressor 1 opposite the first turbine 2. With this arrangement, the first air cycle machine based on the first shaft 21 is known as a three-wheel machine, while the second air cycle machine based on the second shaft 22 is known as a two-wheel machine.

The air conditioning system according to FIG. 1 further includes a main heat exchanger 7 and a primary heat exchanger 8 that are connected successively in series with each other and to a cooling air shaft or duct 6. During flight of the aircraft, external ram air is introduced to flow through the main heat exchanger 7, the primary heat exchanger 8, and the cooling air shaft 6, and then again to be dumped overboard through an exhaust air outlet. The fan 5 connected to an end of the first shaft 21 positively blows or drives the air flowing through and out of the cooling air shaft or duct 6. This is particularly significant when the aircraft is operating on the ground, i.e. when the flow of ram air is insufficient or nonexistent, so that the entire cooling air flow through the heat exchangers 7 and 8 is driven by the fan 5. All of the following discussion of the invention is particularly significant in this context, i.e. when the aircraft is operating on the ground.

Furthermore, hot compressed air that is generally designated as "bleed air" in FIG. 1 is provided to the air conditioning system in the form of engine bleed air from one or more of the aircraft main engines, or from an auxiliary power unit (APU) engine, or alternatively from an external source of compressed air such as a high pressure ground connector when the aircraft is parked on the ground. This hot compressed bleed air is delivered into the primary heat exchanger 8 (to flow through the other heat exchange passages separate from the cooling ram air that flows through the cooling air shaft 6), whereby the bleed air is cooled and then delivered to the first compressor 1, which is connected down-stream from the primary heat exchanger 8.

The cooled bleed air is compressed and heated again to a higher temperature level by the first compressor 1, and is then delivered to the second compressor 3, where this air is compressed and heated still further to a higher pressure level and a higher temperature level, and is then delivered to and flows through the main heat exchanger 7 (in passages separate from the cooling air), where it is once again cooled by heat exchange with the cooling flow of ram air. Upon leaving the main heat exchanger 7, this air has a prescribed high pressure and a prescribed cooled temperature, and is then conveyed through a split duct 16 which functions as a simple water separator in order to remove water and moisture from this cooled and pressurized bleed air.

Various other generally conventional components such as control and regulating valves are connected and arranged at various locations in the air conditioning system of FIG. 1, to control and regulate the operation thereof. For example, two overload control valves 9 and 10, an economy valve 11, a low pressure temperature control valve 12, a high pressure temperature control valve 13, a low pressure bypass valve 14, a high pressure bypass valve 15, a water separator 17, a reheater heat exchanger 18, and a condenser 19 are arranged and connected in respective associated conduits or ducts as shown in FIG. 1. These elements cooperate to provide the main supply of air conditioning air from a main air conditioning pack outlet 26. Also, the rotatable shafts are supported by any conventionally known rotation bearings. The function and operation of each one of these additional elements is generally known and understood by persons of ordinary skill in the art, so a detailed description thereof is unnecessary herein. The present invention is not in each individual component or the general operation or connection of each individual component, but rather in the combination and interconnection of all of the components as described and shown herein, and especially with an auxiliary compressor as will be described below with regard to FIG. 2.

Figure 2:
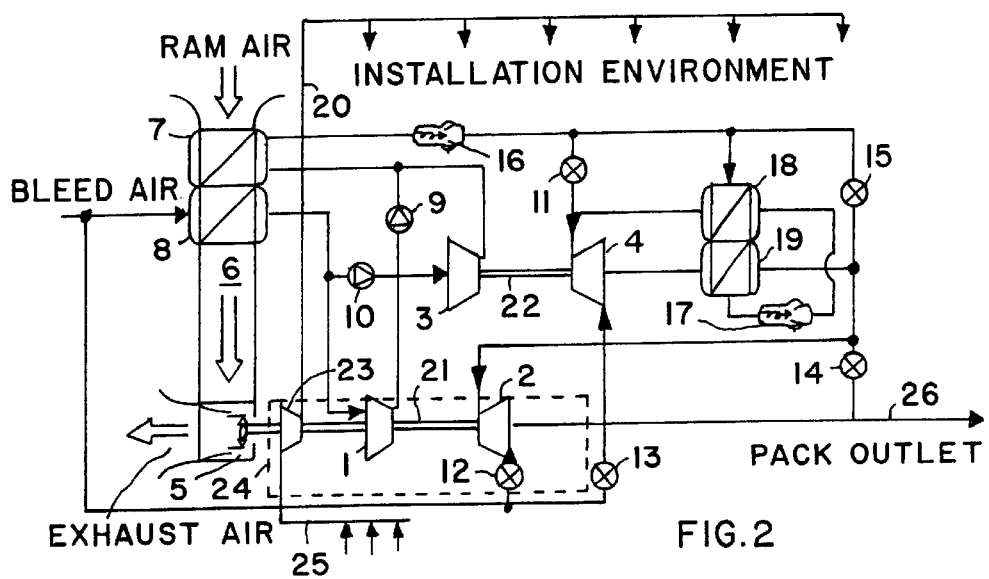
FIG. 2 is a schematic block circuit diagram of an air conditioning system according to the invention, generally corresponding to FIG. 1, but further including an auxiliary compressor.
Figure 4:
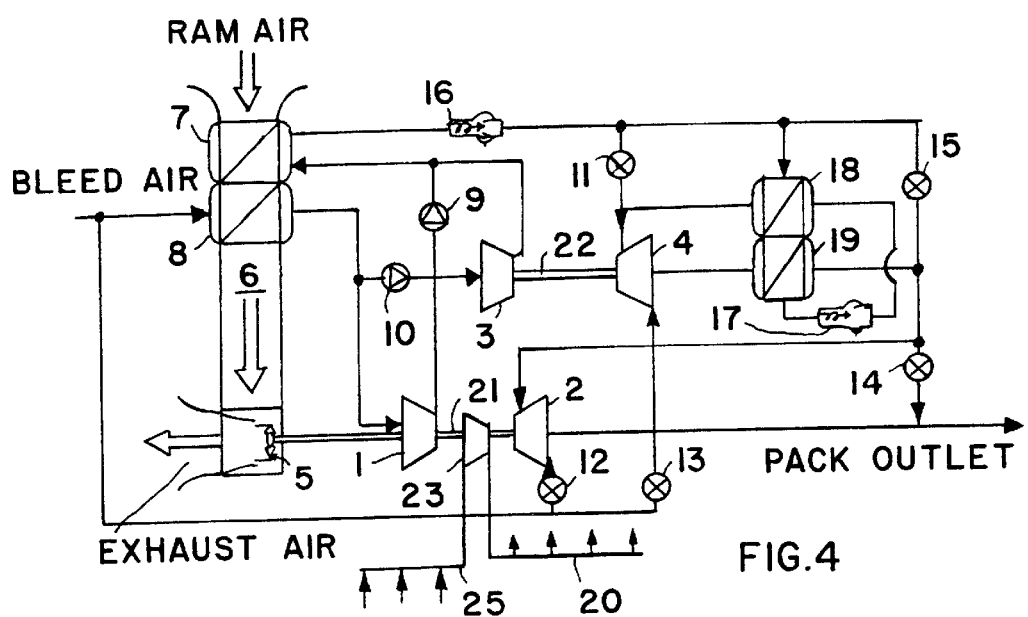
FIG. 4 is a schematic diagram of another inventive alternative with the auxiliary compressor arranged between the compressor and the turbine on the first shaft.

Now referring to FIG. 2, a special additional feature of the invention is that a further or third auxiliary compressor 23 is arranged on at least one of the rotatable shafts of the air conditioning system. Particularly in the example shown in FIG. 2, the auxiliary compressor 23 is fixed on or connected to the first rotatable shaft 21 so as to rotate therewith. In this example, the auxiliary compressor 23 is arranged on the shaft 21 between the first compressor 1 and the fan 5. Alternatively, the auxiliary compressor 23 can be arranged between the compressor 1 and the turbine 2 (see FIG. 4), or on an end of the shaft 21 opposite the fan 5.

This auxiliary compressor 23 will be positively driven by the shaft on which it is mounted, e.g. the first shaft 21, whenever this shaft is rotating, which basically means whenever the air conditioning system is operational. Thereby, the auxiliary compressor 23 will draw in external environmental air from out-side of the aircraft, or interior air from within the aircraft, or air from another source of air, through an air intake line 25, and will then compress this air to the required pressure level and deliver it into a ventilation air distribution duct 20 connected to the outlet of the auxiliary compressor 23. An auxiliary heat exchanger can be interposed between the auxiliary compressor 23 and the ventilation air distribution duct 20 to cool the compressed auxiliary air, if needed or desired.

In this manner, the auxiliary compressor 23 serves to reliably provide a redundant supply of cooling and ventilating air through the air distribution network, e.g. the ventilation air distribution duct 20, to any space or spaces within the aircraft connected to the air distribution duct 20. This supply of air is redundant because it is in addition to the usual air conditioning air provided by the air conditioning system through the air conditioning pack outlet 26. Also, this supply of ventilation air from the auxiliary compressor 23 is reliable because it will surely be provided any time the shaft to which the auxiliary compressor 23 is mechanically connected, is rotationally driven. This will be the case essentially whenever the air conditioning system is operational.

Figure 3:
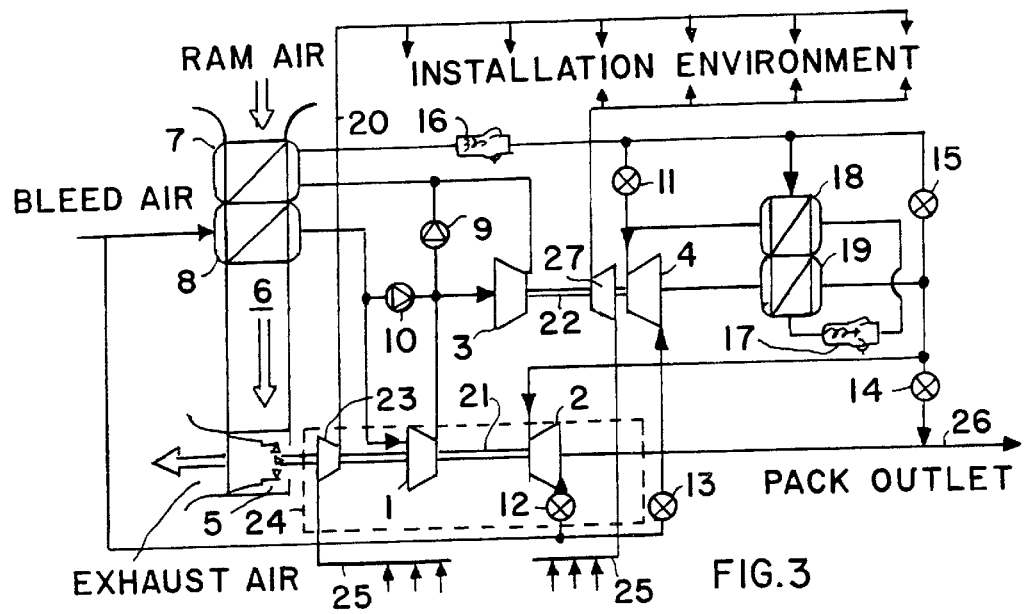
FIG. 3 is a schematic block circuit diagram of an alternative embodiment of an air conditioning system according to the invention, with a further second auxiliary compressor.

In this context, it is possible to connect the auxiliary compressor 23 to either the first shaft 21 or the second shaft 22, but it is preferred to connect the auxiliary compressor 23 to the first shaft 21, because this is the shaft of which the operation is indispensable for the operation of the air conditioning system, especially during ground operations of the aircraft, since the cooling air fan 5 is driven by this first shaft 21. Namely, if the second shaft 22 becomes non-operational or malfunctions for any reason, this associated two-wheel machine could be effectively removed from the air conditioning cycle, and the overall air conditioning system could continue to operate at a partial capacity using only the three-wheel machine based on the first shaft 21. On the other hand, if the first shaft 21 becomes non-operational for any reason, then the overall air conditioning system would essentially be non-operational for lack of the cooling air flow that needs to be driven by the fan 5 (especially for ground operation of the aircraft). Thus, arranging the auxiliary compressor 23 on the first shaft 21 assures the highest reliability of operation of the compressor 23 whenever the air conditioning system is operational. It is also possible to arrange a first auxiliary compressor 23 on the first shaft 21, and a second auxiliary compressor 27 on the second shaft 22 connected correspondingly to an air intake line 25 and an air distribution duct 20 t o provide a further degree of redundancy and reliability (see FIG. 3).

The ventilation air distribution duct 20 may deliver the auxiliary ventilation air, f or example, into the installation environment or installation space in which the air conditioning unit is (or units are) installed. In this manner, adequate ventilation and cooling air is positively and reliably provided for the installation space whenever the air conditioning unit is (or units are) operating. Thereby, the necessity of shutting down an air conditioning unit due to overheating is avoided. Alternatively or additionally, the ventilation air distribution duct 20 can deliver the auxiliary ventilation air to other spaces within the aircraft that require a positively ensured constant ventilation and air conditioning or cooling, for example the cockpit space, or areas of the passenger cabin or the freight compartment or cargo hold. As a further alternative, the auxiliary air can be provided to satisfy the emergency or redundant air needs of another air conditioning unit, for example of which a compressor is failing or has failed, as described below in connection with FIG. 6.

Figure 5:
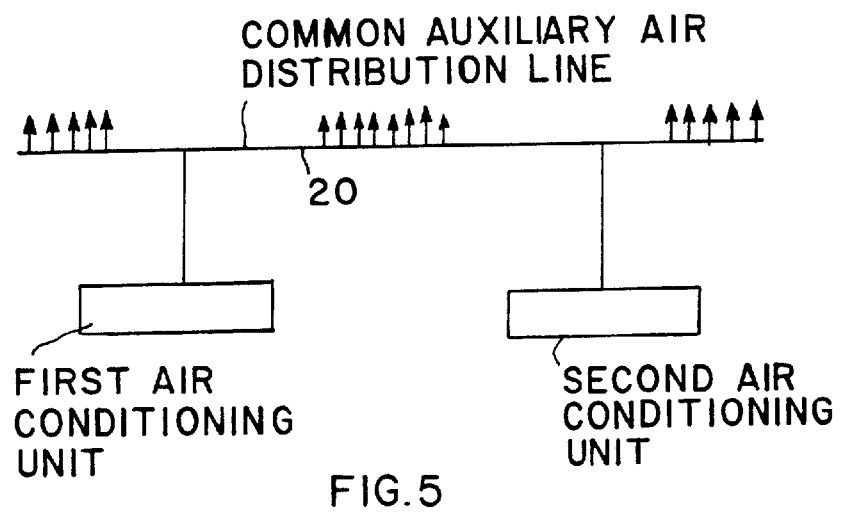
FIG. 5 is a schematic diagram of two of the inventive air conditioning units with their respective auxiliary compressor outlets connected to a common ventilation air distribution duct.
Figure 6:
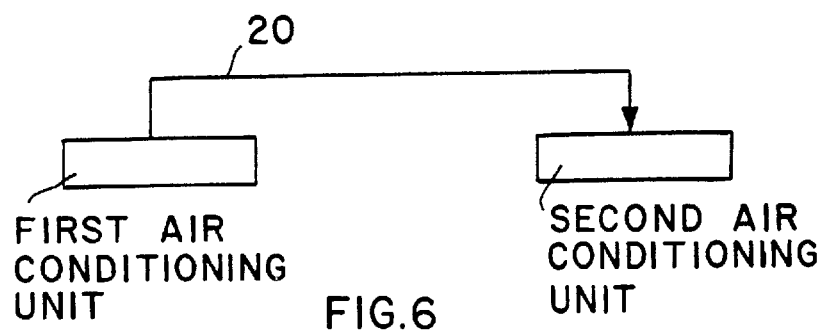
FIG. 6 is a schematic diagram of two of the inventive air conditioning units with the auxiliary compressor outlet air line of the first unit being connected to the second unit.

With reference to FIGS. 5 and 6, the air conditioning system according to the invention, especially in a high capacity passenger aircraft, may include several air conditioning units as illustrated in FIG. 2, whereby each of the air conditioning units is equipped with at least one auxiliary compressor mounted on or mechanically connected to at least one rotatable shaft of the respective air conditioning unit. All of these auxiliary compressors of the several air conditioning units are connected to a common ventilation air distribution duct or network as shown in FIG. 5, to achieve a multiple redundancy and a high degree of selectability of the source and destination of auxiliary ventilation and cooling air, among any of the spaces or air consuming devices connected to the distribution duct or network.

Sufficient shaft power must be provided to the auxiliary compressor 23 so that it can provide the necessary pressurization and quantity flow of air, such as exterior air, for the required auxiliary or redundant positive ventilation of the installation space or other important spaces in the aircraft. Since this power required by the auxiliary compressor 23 is taken from the rotatable shaft 21 (in the illustrated example), the energy balance of all components connected to this shaft will, of course, be altered in comparison to the case without such an auxiliary compressor. As a result, it will be necessary to re-adapt or re-tune all of the rotary components connected to this rotatable shaft, and also all of the other air handling units allocated to and connected to this turbo-machine (such as the intercooling unit, condenser group, etc.) in terms of the energy balance, so as to still efficiently achieve and maintain the required total energy output. Carrying out such a re-tuning or re-adaptation with regard to a particular system or application means that the required air conveying and throttling devices of the turbo-machine as well as the devices of the intercooling unit and the condensing group must be re-sized or re-tuned in comparison to a properly tuned system without the auxiliary compressor provided therein.

The present inventive arrangement of an auxiliary compressor can thus be provided as original equipment in a new aircraft or new air conditioning system for an aircraft, but can also be retro-fitted into a previously existing air conditioning system of an aircraft, as long as there is sufficient space for arranging and connecting the auxiliary compressor to an existing rotatable shaft, and as long as the energy balance can be re-tuned to account for the power utilization by the auxiliary compressor as described above.

While FIG. 2 shows only a single example arrangement of one auxiliary compressor 23 on the first shaft 21, numerous other arrangements are possible according to the invention, as generally mentioned above. Particularly, at least the following variations are possible:

a) one shaft with three compressors and one turbine;
b) one shaft with three compressors and two turbines;
c) a first shaft with two compressors and one turbine, and a second shaft with one compressor and one turbine;
d) a first shaft with three compressors and one turbine, and a second shaft with one compressor and one turbine;
e) a first shaft with one compressor and one turbine, and a second shaft with two compressors and one turbine; and
f) a first shaft with one compressor and one turbine, and a second shaft with three compressors and one turbine.

In this description, the term "first shaft" generally designates the shaft on which the cooling air fan 5 is arranged, while the term "second shaft" designates the shaft of a two-wheel machine without a cooling air fan. The terms "first" and "second" could be reversed, however. In any event, the above-mentioned combinations are distinguishable by the arrangements of compressors (including the auxiliary compressor) and turbines relative to a shaft with a cooling air fan and relative to a shaft without a cooling air fan.

With the above described measures, it is ensured that a redundant or auxiliary supply of pressurized ventilation air is made available automatically upon switching on the respective air conditioning unit, and continuously for as long as this air conditioning unit remains operational. Thereby, the associated or allocated installation space or other space within the aircraft is reliably ventilated and cooled in a redundant and continuous manner. Moreover, the redundant supply of air from a respective auxiliary compressor can be provided to further stages of compression and expansion in the associated air conditioning unit or another air conditioning unit (e.g. in FIG. 6). Thereby, the failure of a given first compressor 1 or second compressor 3 can be compensated for by appropriate circuit connection of the auxiliary compressor 23.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An air conditioning system for an aircraft, comprising at least one air conditioning unit, which respectively comprises:
   a first rotatable shaft,
   a first compressor connected to said first rotatable shaft so as to rotate therewith,
   a first turbine connected to said first rotatable shaft so as to rotate therewith,
   a main air circuit beginning at a bleed air inlet and ending at a main air conditioning air outlet, with said first compressor and said first turbine interposed in series in said main air circuit,
   a first auxiliary compressor that is connected to said first rotatable shaft so as to rotate therewith, and that has an auxiliary air inlet and an auxiliary air outlet, and
   a first auxiliary air line connected to said auxiliary air outlet.

2. The air conditioning system according to claim 1, wherein said first auxiliary compressor is not interposed in and is not connected to said main air circuit.

3. The air conditioning system according to claim 1, wherein said air conditioning unit further comprises a cooling air duct, at least one heat exchanger with a first heat exchange passage interposed in said main air circuit and a second heat exchange passage connected to said cooling air duct, and a cooling air fan that is connected to said first rotatable shaft so as to rotate therewith and that is connected to said cooling air duct to move cooling air through said second heat exchange passage of said heat exchanger and through said cooling air duct.

4. The air conditioning system according to claim 1, wherein no additional air-moving device is connected to said first rotatable shaft in addition to said first compressor, said first turbine, and said first auxiliary compressor.

5. The air conditioning system according to claim 1, wherein said air conditioning unit further comprises a second rotatable shaft, a second compressor connected to said second rotatable shaft so as to rotate therewith, and a second turbine connected to said second rotatable shaft so as to rotate therewith, wherein said second compressor and said second turbine are interposed in series in said main air circuit.

6. The air conditioning system according to claim 5, wherein no additional air-moving device is connected to said second rotatable shaft in addition to said second compressor and said second turbine.

7. The air conditioning system according to claim 5, wherein said air conditioning unit further comprises a second auxiliary compressor connected to said second rotatable shaft so as to rotate therewith, wherein said second auxiliary compressor is not interposed in and not connected to said main air circuit.

8. The air conditioning system according to claim 1, wherein said first auxiliary compressor is located between said first compressor and said first turbine on said first rotatable shaft.

9. The air conditioning system according to claim 1, wherein said first auxiliary compressor is located on said first rotatable shaft at a location that is not between said first compressor and said first turbine.

10. The air conditioning system according to claim 1, wherein said first auxiliary compressor is retrofitted onto said first rotatable shaft, which is a previously existing rotatable shaft of a previously existing air conditioning unit of a previously existing aircraft.

11. The air conditioning system according to claim 1, wherein said first rotatable shaft, said first compressor, said first turbine and said first auxiliary compressor together make up a unitary air cycle machine, being a ventilation compressor unit.

12. The air conditioning system according to claim 1, wherein said auxiliary air inlet of said first auxiliary compressor is connected to an installation environment in an installation space in which said air conditioning unit is installed.

13. The air conditioning system according to claim 1, wherein said air conditioning unit further comprises an auxiliary air intake line connected to said auxiliary air inlet of said first auxiliary compressor and connected to an exterior environment outside of the aircraft in which said air conditioning system is installed.

14. The air conditioning system according to claim 1, wherein said auxiliary air line is connected and communicates into an installation environment immediately surrounding said air conditioning unit.

15. The air conditioning system according to claim 1, wherein said auxiliary air line is connected and communicates into a fuselage interior space of the aircraft in which said air conditioning system is installed, so that said first auxiliary compressor delivers redundant compressed auxiliary air through said auxiliary air line into said fuselage interior space.

16. The air conditioning system according to claim 1, further comprising a common auxiliary air distribution line, wherein said at least one air conditioning unit comprises a first one of said air conditioning unit and a second one of said air conditioning unit, and wherein said auxiliary air line of said first air conditioning unit and said auxiliary air line of said second air conditioning unit are both connected to said common auxiliary air distribution line.

17. The air conditioning system according to claim 1, wherein said at least one air conditioning unit comprises a first one of said air conditioning unit and a second one of said air conditioning unit, and wherein said auxiliary air line of said first air conditioning unit is connected to said second air conditioning unit.

18. The air conditioning system according to claim 1, wherein said air conditioning unit further comprises a cooling air duct, and a cooling air fan that is connected to said first rotatable shaft so as to rotate therewith and connected to said cooling air duct so as to move cooling air therethrough and that is not interposed in and is not connected to said main air circuit.

* * * * *